G.E. Hayes' Impt in Vulcanising Flasks.

Assigned to the
Buffalo Dental Manufacturing Company

73974

PATENTED
FEB 4 1868

Witnesses.
J M Combs
A Leclerc

G. E. Hayes

United States Patent Office.

GEORGE E. HAYES, OF BUFFALO, NEW YORK, ASSIGNOR TO BUFFALO DENTAL MANUFACTURING COMPANY, OF SAME PLACE.

*Letters Patent No. 73,974, dated February 4, 1868.*

IMPROVEMENT IN DENTISTS' FLASKS.

*The Schedule referred to in these Letters Patent and making part of the same.*

TO ALL WHOM IT MAY CONCERN:

Be it known that I, GEORGE E. HAYES, of Buffalo, in the county of Erie, and State of New York, have invented a new and useful Improvement in Vulcanizing-Flasks, of which the following is a full, clear, and exact description, reference being had to the accompanying drawing, forming part of this specification, and in which—

Figure 1:
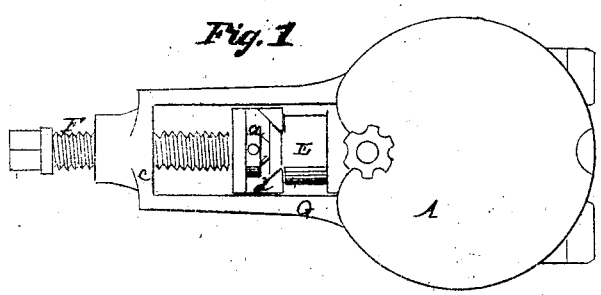
Figure 2:
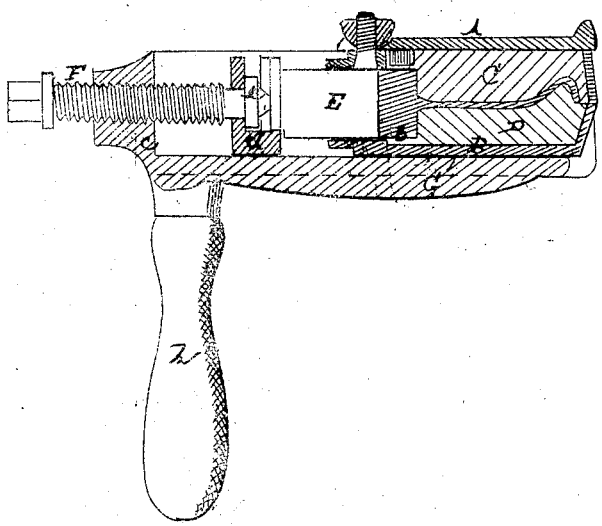

Figure 1 represents a plan of a vulcanizing-flask for dentists' use, constructed according to my invention, and Figure 2 a longitudinal vertical section of the same.

Similar letters of reference indicate corresponding parts.

This, my invention, is designed more especially for dental vulcanite work, and consists in constructing the interior of vulcanizing-flasks with a cavity that is in connection with the mould, and which is made to receive a portion of the rubber, and in providing an opening to the said cavity through the side of the flask, and fitting said opening with a piston or plunger that acts upon the rubber in the cavity to effect a perfect filling of the mould.

By way of more clearly explaining this, my improvement, it may here be well to remark that, in a general way, but two methods have hitherto been adopted for filling the moulds with rubber in preparing dental vulcanite work. The one, and most common, is to place all the rubber (in its raw state) required for a certain work, in the mould, and then to bring the sections of the flask together by means of screws or other pressing-devices, so as to force the rubber to its place in the mould. This plan or method of working does not admit of the sections of the flask being fully closed before applying the necessary pressure, and involves the necessity of handling a hot flask while the rubber is being packed. The other method is to place the rubber in the cylinder of what may be termed a separate force-pump, which is put in connection with the flask or mould, and power applied to the pump to force the plastic rubber into the flask or mould, but this plan requires a comparatively expensive mechanism, which is separate and distinct from the flask, and takes considerable time to fill the empty mould, besides a large expenditure of power. These objections are obviated by this, my improvement, as will appear from the following description of it.

In the accompanying drawing, A and B are the two sections of a flask, and C D the plaster or other suitable mould therein. This flask, as formed by the united sections A and B, has an opening, $a$, made in the one side of it, within which a piston or plunger, E, is inserted. When the mould is to be made in the flask, this plunger is pressed forward to project a given distance within the flask, so that on pouring the liquid plaster into the mould, it will surround it and the tooth-model or pattern at the same time, leaving a cavity, $b$, in the mould. So soon as the plaster has set, and before opening the mould, the plunger E should be drawn back, which may be done by slackening a forcing-screw, F, that fits through an extension, $c$, of a flask-holder, G, provided, it may be, with a handle, $h$, and sliding back a box, $d$, with which the plunger is connected, preferably in a free and detachable manner, and with which the screw F gears by a collar, $e$. The flask is then opened, and the pattern or model removed in the usual way. The raw rubber is then inserted in the mould, without, of necessity, the prior application of heat to the latter, by cutting it into strips and placing the greater portion required for a single filling within the mould proper or impression left by the model, but not filling or stocking it to an extent that will prevent the flask afterwards closing freely. After this, the balance of the rubber is inserted in the cavity $b$ left by the plunger. This being done, the flask is closed and securely fastened, and the plunger then introduced through the opening $a$, and the whole heated up to the boiling-point of water, or thereabouts, so as to soften the rubber, and the plunger E worked forward, say, by the screw F, to gradually force the softened rubber out of the cavity $b$ into the mould, and so to compress with any desired force, and add to the rubber previously supplied the mould proper, to fill every part of the latter. This accomplished, any surplus or remaining rubber will be withdrawn with the plunger on working it back, or by interposing tin-foil or other suitable material between the rubber and end of the piston the surplus may be left in the flask. The opening $a$ is then closed with plaster or a plug, and the whole then ready to be passed over to the vulcanizer.

What is here claimed and desired to be secured by Letters Patent, is—

1. The process, substantially as herein described, of filling vulcanizing-flasks, or the moulds contained therein, by constructing the flask with a side opening, $a$, and forming a cavity, $b$, in the mould, by a plunger, E, combined or connected in a direct manner with said flask, and, after having first packed the mould proper, also the cavity $b$ communicating therewith, with rubber and closing the flask, projecting the plunger through the cavity in the flask to press upon the rubber, substantially as specified.

2. The moulds C and D, provided with an enlarged cavity, $b$, in communication with a side opening, $a$, made in the flask for reception of a portion of the requisite amount of rubber necessary to fill the mould, essentially as herein set forth.

3. The combination, with a vulcanizing-flask having a side opening, $a$, in it, of a plunger, E, for operation therein, substantially as specified.

GEO. E. HAYES.

Witnesses:
   CHAS. B. BROWN,
   J. E. ROBIE, Jr.